(12) United States Patent
Park et al.

(10) Patent No.: US 12,159,121 B2
(45) Date of Patent: Dec. 3, 2024

(54) ELECTRONIC DEVICE FOR TRANSLATING VOICE OR TEXT AND METHOD THEREOF

(71) Applicant: Samsung Electronics Co., Ltd., Suwon-si (KR)

(72) Inventors: Sangmin Park, Suwon-si (KR); Yoonju Lee, Suwon-si (KR); Gajin Song, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 17/423,740

(22) PCT Filed: May 21, 2021

(86) PCT No.: PCT/KR2021/006315
§ 371 (c)(1),
(2) Date: Jul. 19, 2021

(87) PCT Pub. No.: WO2021/246689
PCT Pub. Date: Dec. 9, 2021

(65) Prior Publication Data
US 2022/0374615 A1    Nov. 24, 2022

(30) Foreign Application Priority Data
Jun. 4, 2020   (KR) .......................... 10-2020-0067759

(51) Int. Cl.
*G06F 40/58* (2020.01)
*G10L 15/22* (2006.01)
*G10L 15/26* (2006.01)

(52) U.S. Cl.
CPC .............. *G06F 40/58* (2020.01); *G10L 15/22* (2013.01); *G10L 15/26* (2013.01); *G10L 2015/227* (2013.01); *G10L 2015/228* (2013.01)

(58) Field of Classification Search
CPC ....................................................... G06F 40/45
See application file for complete search history.

(56) References Cited

U.S. PATENT DOCUMENTS

| 2006/0293893 | A1  | 12/2006 | Horvitz |
| 2007/0208813 | A1  | 9/2007 | Blagsvedt et al. |
| 2008/0243473 | A1* | 10/2008 | Boyd ....................... G06F 40/58 704/2 |

(Continued)

FOREIGN PATENT DOCUMENTS

| JP | 2003-108551 A | 4/2003 |
| KR | 10-2012-0109242 A | 10/2012 |

(Continued)

OTHER PUBLICATIONS

International Search Report dated Aug. 26, 2021, in International Application No. PCT/KR2021/006315.

*Primary Examiner* — Feng-Tzer Tzeng
(74) *Attorney, Agent, or Firm* — Jefferson IP Law, LLP

(57) ABSTRACT

An electronic device is provided. The electronic device includes an input unit configured to receive a voice or text, an output unit, and a processor. The processor is configured to determine context information, translate the received voice or text based on the context information, convert the translated voice or text, and output the converted voice or text using the output unit.

16 Claims, 16 Drawing Sheets

(56) References Cited

U.S. PATENT DOCUMENTS

| | | | |
|---|---|---|---|
| 2009/0083023 A1* | 3/2009 | Foster | G06F 40/45 |
| | | | 704/3 |
| 2010/0004919 A1 | 1/2010 | Macherey et al. | |
| 2011/0184721 A1* | 7/2011 | Subramanian | G10L 19/0018 |
| | | | 704/4 |
| 2013/0197898 A1 | 8/2013 | Choi et al. | |
| 2013/0297284 A1 | 11/2013 | Choi et al. | |
| 2019/0065476 A1 | 2/2019 | Kwon et al. | |
| 2020/0074981 A1 | 3/2020 | Chae et al. | |
| 2020/0082806 A1 | 3/2020 | Kim et al. | |
| 2021/0314523 A1* | 10/2021 | Kamisetty | H04L 65/1069 |

FOREIGN PATENT DOCUMENTS

| | | |
|---|---|---|
| KR | 10-1344177 B1 | 12/2013 |
| KR | 10-2016-0020624 A | 2/2016 |
| KR | 10-1603203 B1 | 3/2016 |
| KR | 10-1623891 B1 | 5/2016 |
| KR | 10-1751942 B1 | 6/2017 |
| KR | 10-2018-0125213 A | 11/2018 |
| KR | 10-1916781 B1 | 11/2018 |
| KR | 10-2019-0021146 A | 3/2019 |
| KR | 10-2019-0085883 A | 7/2019 |
| KR | 10-2062524 B1 | 1/2020 |
| KR | 10-2147519 B1 | 8/2020 |
| KR | 10-2243935 B1 | 4/2021 |
| WO | 2007/002606 A2 | 1/2007 |

\* cited by examiner

ELECTRONIC DEVICE FOR TRANSLATING VOICE OR TEXT AND METHOD THEREFOR

BACKGROUND

1. Field

The disclosure relates to an electronic device for translating a voice or text and a method therefor.

2. Description of Related Art

Due to technological developments, translation can also be supported by electronic devices. A user can install and use a translation-related application on an electronic device. For example, when a user installs a translation application for a country before going on a trip, the user can chat with people from different countries and can purchase a product using the application.

The above information is presented as background information only to assist with an understanding of the disclosure. No determination has been made, and no assertion is made, as to whether any of the above might be applicable as prior art with regard to the disclosure.

SUMMARY

Current translation technology of electronic devices may be suitable to deliver information about facts but has difficulty in conveying emotions for a counterpart and cultural and social differences of the counterpart's country.

Aspects of the disclosure are to address at least the above-mentioned problems and/or disadvantages and to provide at least the advantages described below. Accordingly, an aspect of the disclosure is to provide an electronic device and a method for translating a voice or text in consideration of social and/or cultural differences between people who transmit and receive voices and/or text.

According to an embodiment, it is possible to reduce errors caused by mechanical translation or literal translation. For example, the same word may have different meanings depending on context, and the literal translation of a word may cause a mistranslation.

An embodiment may be provided to reduce errors in translation that may be caused due to social or cultural differences.

Additional aspects will be set forth in part in the description which follows and, in part, will be apparent from the description, or may be learned by practice of the presented embodiments.

In accordance with an aspect of the disclosure, an electronic device is provided. The electronic device includes an input unit configured to receive a voice or text, an output unit, and a processor. The processor is configured to determine context information, translate the received voice or text based on the context information, convert the translated voice or text, and output the converted voice or text using the output unit.

In accordance with an aspect of the disclosure, an operating method of an electronic device is provided. The operating method includes receiving a voice or text, determining context information, translating the received voice or text based on the context information, converting the translated voice or text, and outputting the converted voice or text.

According to various embodiments, it is possible to translate a voice or text, reflecting the intention of a person transmitting the voice and/or text.

According to various embodiments, it is possible to translate a voice or text in consideration of the cultural and/and social environment of a person receiving the voice and/or text.

According to various embodiments, a user may provide context information necessary for translation by setup.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following described with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
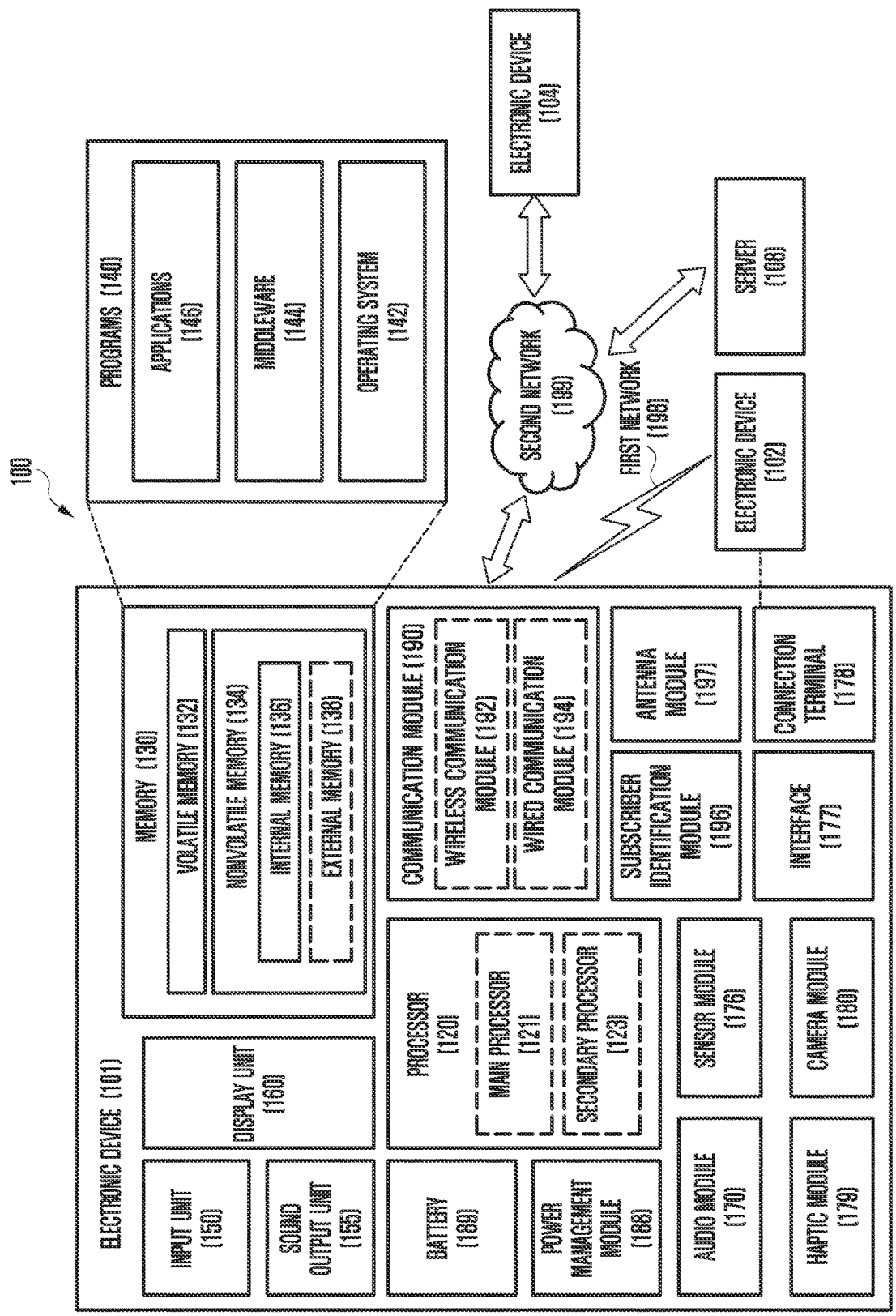
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device (or sound output unit) 155, a display device (or display unit) 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

Figure 2A:
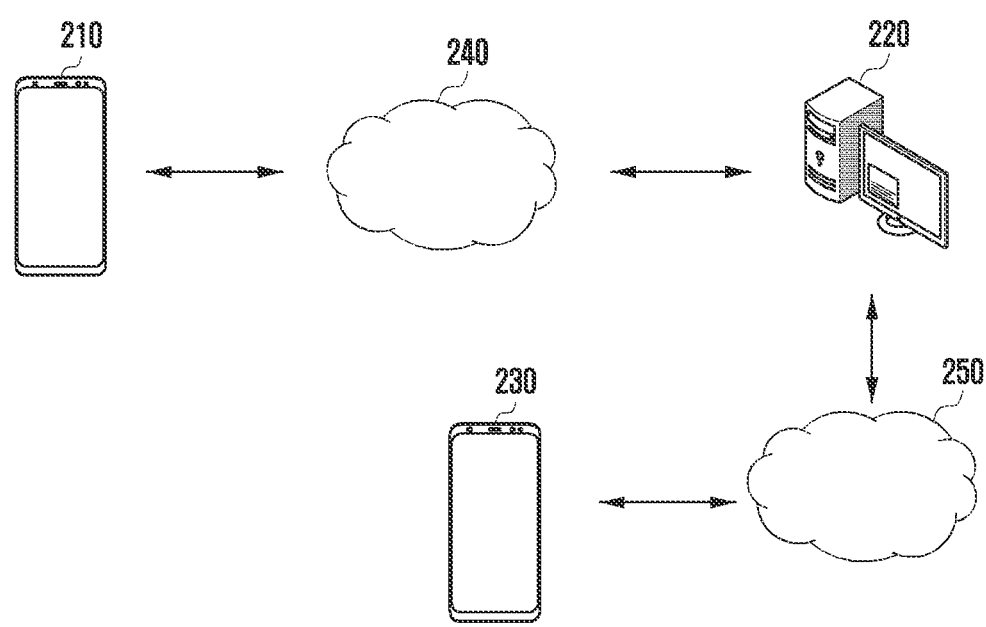
FIG. 2A illustrates a use environment according to an embodiment of the disclosure.

FIG. 2A illustrates a use environment according to an embodiment of the disclosure.

Figure 2B:
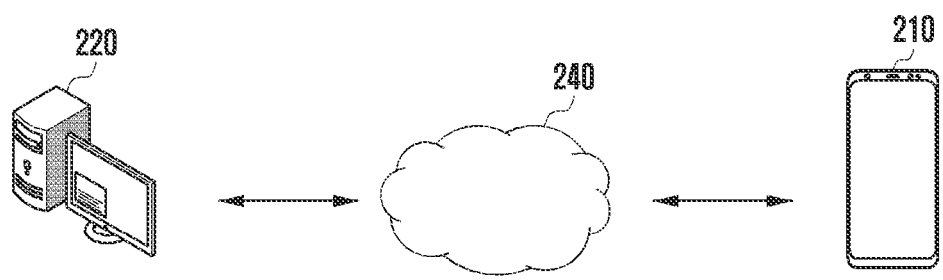
FIG. 2B illustrates a use environment according to an embodiment of the disclosure.

FIG. 2B illustrates a use environment according to an embodiment of the disclosure.

Figure 2C:
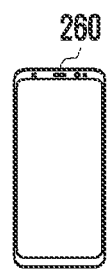
FIG. 2C illustrates a use environment according to an embodiment of the disclosure.

FIG. 2C illustrates a use environment according to an embodiment of the disclosure.

Referring to FIGS. 2A and 2B, embodiments of supporting translation using a server 220 are illustrated. Specifically, FIG. 2A illustrates an embodiment in which electronic devices 210 and 230 transmit and receive a voice or text to and from each other in different languages. In one example, users working in different countries may have a meeting together. The users may input a voice or text using the respective electronic devices 210 and 230. The input voice or text may be transmitted to the server 220 through networks 240 and 250. The voice or text transmitted to the server 220 may be translated by the server 220 and may be transmitted to the counterparts' electronic devices 230 and 210 through the networks 240 and 250.

Referring to FIG. 2B, an embodiment in which a user translates a voice or text through a server 220 is illustrated. In one example, the user may go to a shop and may purchase a necessary article during a trip. The user may need translation of a conversation with a clerk or information about the article in order to obtain the information about the article. When the user inputs a clerk's voice to an electronic device 210 or scans the information about the article with the electronic device 210, the electronic device 210 may transmit the voice or text input by the user to the server 220 through a network 240. The server 220 may translate the received voice or text and may transmit the translated voice or text back to the electronic device 210 through the network 240. The electronic device 210 may output the translated voice or text.

Referring to FIG. 2C, an embodiment in which an electronic device 260 autonomously supports translation is illustrated. For example, even in a case where a user cannot use a network, the electronic device 260 may provide a translation service. The user may install a translation-related application, and may be provided with a translation service by executing the application when necessary. The electronic device 260 may translate an input voice or text using an internal processor and may output the translated voice or text.

As described above, an electronic device or an electronic device and a server for translating and outputting input data (e.g., text and a voice) described above may be collectively referred to as a translation system hereinafter.

Figure 3:
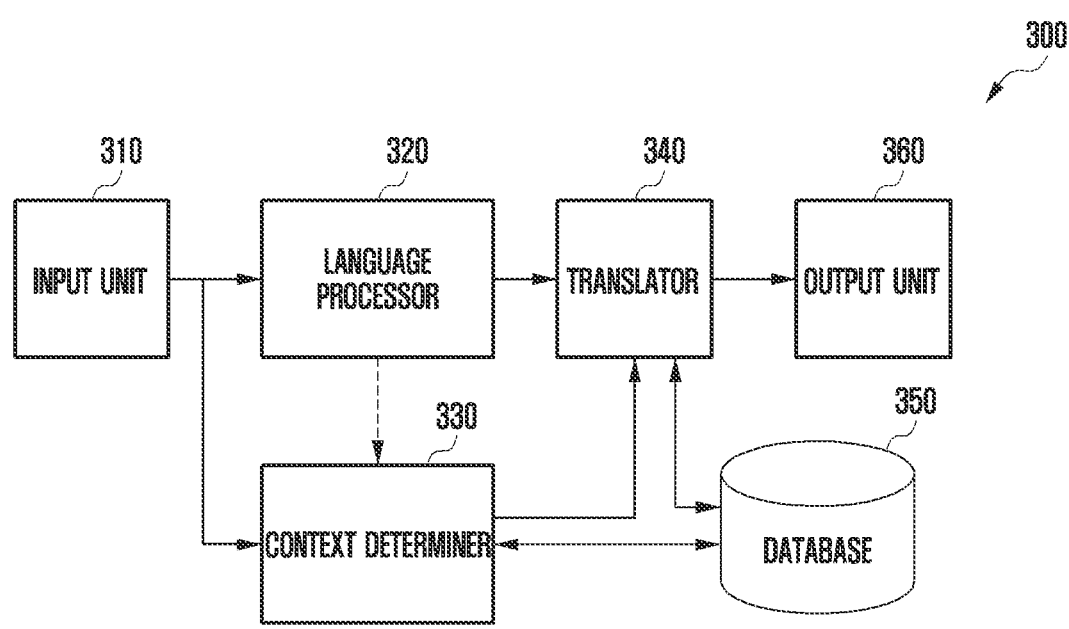
FIG. 3 is a block diagram of a translation system according to an embodiment of the disclosure.

FIG. 3 is a block diagram of a translation system according to an embodiment of the disclosure.

Referring to FIG. 3, an electronic device (e.g., the electronic device 260 of FIG. 2C) or a server (e.g., the server 220 of FIG. 2A or 2B) may include a translation system 300. According to various embodiments, the electronic devices 210, 230, and 260 or the server 220 may include part of the translation system 300. For example, the electronic device 210 may include part of a context determiner 330, an input unit 310, and an output unit 360 in the translation system 300. The server 220 may include part of the context determiner 330, the input unit 310, the output unit 360, a language processor 320, a translator 340, and a database (DB) 350 in the translation system 300.

According to various embodiments, the translation system 300 may include the input unit 310, the language processor 320, the context determiner 330, the translator 340, the database 350, and the output unit 360.

When the translation system 300 is included in the electronic device 260, the input unit 310 according to various embodiments may include at least some of at least one input device (e.g., the input device 150 of FIG. 1), at least one sensor (e.g., the sensor module 176 of FIG. 1), at least one touch display (e.g., the display device 160 of FIG. 1), and at least one camera (e.g., the camera module 180 of FIG. 1).

When the translation system 300 is included in the electronic device 260, the input unit 310 according to various embodiments may receive a voice and/or text from a user using the input device (e.g., a microphone or a keyboard) or the touch display. The user may scan text using the camera of the electronic device 260, and the electronic device 260 may recognize the scanned text. The electronic device 260 may obtain translation-related data through the input unit 310. For example, the translation-related data may include at least some of information about an input language and/or an output language, sensing data (e.g., global positioning system (GPS) data) for determining user or environment context, an image or a video captured through the camera, and a user voice and a background sound received through the microphone. Alternatively, the electronic device 260 may generate context information based on a user input received through the input unit 310. For example, the electronic device 260 may receive information about a tone (e.g., an honorific) desired by the user through a tone selection interface displayed on the display and may generate context information.

When the translation system 300 is included in the server 220, the input unit 310 according to various embodiments may include a communication circuit (e.g., the communication module 190 of FIG. 1).

When the translation system 300 is included in the server 220, the input unit 310 according to various embodiments may receive a voice, text, and/or translation-related data (e.g., context information, an image, or a video) from the electronic device 210 through a network (e.g., the network 240 of FIG. 2A or 2B). For example, the input unit 310 may receive context information generated by the electronic device 210 using the database 350 included in the electronic device 210.

The input unit 310 according to various embodiments may transmit text and/or a voice to be translated to the language processor 320. The input unit 310 may further transmit translation-related data to the language processor 320. The input unit 310 may selectively transmit at least one of the text to be translated, the voice to be translated, and the translation-related data to the context determiner 330.

According to various embodiments, the translation system 300 may include the language processor 320. The language processor 320 may receive text and/or a voice from the input unit 310. Text input from the input unit 310 may be a text to be translated by the translator 340. When a voice is input from the input unit 310, the language processor 320 may convert the input voice into text to be translated. The converted text may be obtained by converting the input voice into text as it is. When the input voice includes a background sound (e.g., a subway announcement or the sound of waves), the language processor 320 may separate the background sound and may convert information about the background sound into text. The language processor 320 may transmit the information about the background sound, which has been converted into the text, to the context determiner 330.

The language processor 320 according to various embodiments may further receive translation-related data from the input unit 310. The language processor 320 may determine an input language and/or an output language based on the translation-related data. Alternatively, the language processor 320 may determine an input language by analyzing an input voice and/or text.

The language processor 320 according to various embodiments may transmit text to be translated to the translator 340. The language processor 320 may further transmit at least one of text to be translated, an input language, and an output language to the context determiner 330.

The context determiner 330 according to various embodiments may receive at least one of text to be translated, a voice, and translation-related data from the input unit 310. The context determiner 330 may further receive text to be translated from the language processor 320. The context determiner 330 may further receive an input language and/or an output language from the language processor 320.

The context determiner 330 according to various embodiments may determine context information using at least one of the text to be translated, the voice, the translation-related data, the input language, and the output language received from the input unit 310 or the language processor 320.

The context determiner 330 according to various embodiments may use the translation-related data in order to determine the context information. The context determiner 330 may further use the database 350 to determine the context information. The context determiner 330 may further determine the context information by retrieving the database 350 based on the translation-related data.

The context determiner 330 according to various embodiments may determine, as the context information, at least one of information relating to an environment, information relating to a user, information relating to the text to be translated, and information relating to a user relationship using the translation-related data and/or the database 350. For example, when at least one of location information (e.g., GPS) about the electronic device, an input language, and an output language is received as the translation-related data, the context determiner 330 may determine context information relating to an environment including country information and city information. The context determiner 330 may determine more specific context information further using the database 350. In another example, when a voice to be translated is received, the context determiner 330 may extract a word or vocabulary included in the voice to be translated and may retrieve a social and/or cultural factor and a relationship (e.g., a sister or a boy) corresponding to the word or vocabulary from the database 350, thereby determining context information. When a voice to be translated is received, the context determiner 330 may analyze a background sound (e.g., the sound of waves, a train, or a car) or may analyze the voice, thereby determining a nuance or an emotion (e.g., sadness or happiness) as context information.

When the translation system 300 is included in the server 220, the context determiner 330 according to various embodiments may further receive context information determined by the electronic device 210. The context determiner 330 may receive the context information determined by the electronic device 210 from the input unit 310. The context determiner 330 may be implemented by at least one processor.

The context determiner 330 according to various embodiments may transmit determined context information to the translator 340.

The database 350 according to various embodiments may store context information. For example, information about a word in an input language and a word in an output language may be stored in the database 350. Each word may have a social meaning and/or a cultural meaning. A word in the input language may match a plurality of words in the output language. A plurality of words in the input language may match the same word in the output language. In addition, information about a dialect reflecting a region, information about honorific and ordinary terms, or information reflecting a gender may also be stored in the database 350.

According to various embodiments, the database 350 may also store an emoticon as context information. Emoticons reflecting the input language and/or the output language may be stored in the database 350. An emoticon may reflect a country in which the emoticon is used.

The translator 340 according to various embodiments may receive text input from the input unit 310 or the language processor 320. The text input from the input unit 310 or the language processor 320 may be text to be translated. The translator 340 may receive information about an input language and/or an output language from the input unit 310 or the language processor 320. Further, the translator 340 may receive context information determined by the context determiner 330.

According to various embodiments, the translator 340 may translate the input text based on the determined context information. The translator 340 may translate the text to be translated into an output language based on the input language and the context information. The translator 340 may translate the text selectively using the database 350. For example, when the translator 340 needs to translate text to be translated into an honorific term, the translator 340 may retrieve an honorific term corresponding to a relevant word (e.g., an ending or a vocabulary) from the database 350.

According to various embodiments, the translator 340 may transmit the translated text to the output unit 360.

When the translation system 300 is included in the server 220, the output unit 360 according to various embodiments may include a communication module 190 and/or a voice converter (not shown). The output unit 360 may transmit the text transmitted from the translator 340 to the electronic device 230 according to settings. The output unit 360 may convert the text transmitted from the translator 340 into a voice through the voice converter and may transmit the voice to the electronic device 230. The voice converter may be configured as a software program.

When the translation system 300 is included in the electronic device 230, the output unit 360 according to various embodiments may include a sound output device (e.g., the sound output device 155 of FIG. 1) or a display device (e.g., the display device 160 of FIG. 1). The output unit 360 may output the text transmitted from the translator 340 or may convert the transmitted text into a voice and may output the voice using the sound output device (e.g., a speaker) or the display device (e.g., a touchscreen). Alternatively, the output unit 360 may output the translated text and the converted voice together. The output unit 360 may further include a text-to-speech (TTS) system. The TTS system may be configured as software and may convert text into a voice.

Figure 4:
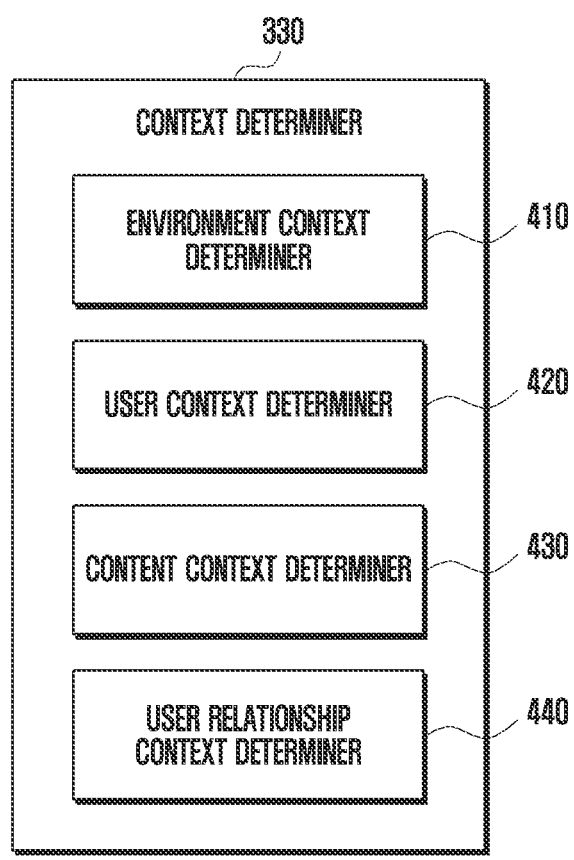
FIG. 4 is a detailed block diagram of a context determiner according to an embodiment of the disclosure.

FIG. 4 is a detailed block diagram of a context determiner 330 according to an embodiment of the disclosure.

Referring to FIG. 4, the context determiner (e.g., the context determiner 330 of FIG. 3) may include at least one of an environment context determiner 410, a user context determiner 420, a content context determiner 430, and a user relationship context determiner 440.

According to various embodiments, the context determiner 330 may receive at least one of text to be translated, a voice, and translation-related data from an input unit (e.g., the input unit 310 of FIG. 3). The context determiner 330 may further receive text to be translated, an input language, and an output language from a language processor (e.g., the language processor 320 of FIGS. 2A to 2C). The input language and/or the output language may be included in the translation-related data.

According to various embodiments, the context determiner 330 may be implemented by a server (e.g., the server 220 of FIG. 2A or 2B), by an electronic device (e.g., the electronic device 260 of FIG. 2C), or by the server 220 and an electronic device (e.g., the electronic device 210 of FIG. 2A or 2B).

According to various embodiments, the context determiner 330 may retrieve necessary data using a database (e.g., the database 350 of FIG. 3). The context determiner 330 may transmit determined context information to a translator (e.g., the translator 340 of FIG. 3).

The environment context determiner 410 according to various embodiments may determine context information based on location information and/or time information relating to a region and a country of the electronic devices 210 and 260 that receive a voice or text. The location information and/or the time information relating to the region and the country of the electronic devices 210 and 260 that receive the voice or text may be translation-related data. For example, when a translation system 300 is included in the server 220, the electronic device 210 may transmit location information about the electronic device 210 determined using a sensor module (e.g., the sensor module 176 of FIG. 1) to the server 220 as translation-related data. The server 220 may receive the translation-related data including the location information about the electronic device 210 through the input unit 310 and may transmit the translation-related data to the context determiner 330. The environment context determiner 410 of the context determiner 330 may determine context information based on the location information about the electronic device 210 of the translation-related data. In another example, when the translation system 300 is included in the electronic device 260, the electronic device 260 may transmit translation-related data including location information about the electronic device 260 determined using the sensor module 176 to the context determiner 330 through the input unit 310. The environment context determiner 410 of the context determiner 330 may determine context information based on the location information about the electronic device 210 of the translation-related data.

According to various embodiments, the environment context determiner 410 may determine information about an environment from a video and/or an image captured by a camera of the electronic device 210 or 260. The video and/or the image captured by the camera of the electronic device 210 or 260 may be transmitted as translation-related data from the input unit 310 to the environment context determiner 410. For example, when there is a tree, a car, or a building, the environment context determiner 410 may determine that the video and/or the image relates to an outside and may determine context information about the outside. When people are sitting around a table and there is food on the table, the environment context determiner 410 may determine that the video and/or the image relates to a restaurant, and when there is a document, the environment context determiner 410 may determine that a meeting is in progress. The electronic device 260 may determine context information further including the number of people and the gender of people in addition to the meeting or the restaurant.

According to various embodiments, when translation-related data includes the voice of a user and a background sound received through an input device 150, the environment context determiner 410 may analyze the received background sound other than the voice of the user and may determine context information. For example, when the translation-related data includes a subway announcement, the environment context determiner 410 may determine the current location of the user and the fact that the user is using a subway as context information. When the translation-related data includes a food ordering sound, the environment context determiner 410 may determine context information by determining that the current location of the user is a cafe or a restaurant.

The user context determiner 420 according to various embodiments may determine information about the user (or speaker) who inputs a voice or text using translation-related data. For example, the user context determiner 420 may analyze a facial expression of the user who inputs the voice or text using the camera included in the electronic device 210 or 260, thereby determining the expression as context information. The user context determiner 420 may further analyze the information about the user from the context of the input text and the tone of the voice, thereby determining context information. For example, when the user makes a video call, the user context determiner 420 may receive an image using the camera included the electronic device 210 or 260 and may determine context information by analyzing the received image.

According to various embodiments, the user context determiner 420 may determine the age and gender of the user from the voice of the user input through the input device 150 and may determine context information including the age and gender of the user. The electronic device 260 may determine intonation from the voice of the user and may determine context information including a nuance and/or the region of origin. For example, when the language of the user is English, the user context determiner 420 may determine context information including the region of origin of the user by determining whether English is American English, British English, or Australian English and, when English is determined as American English, by further determining whether American English is specifically an eastern area style or a western area style.

The content context determiner 430 according to various embodiments may determine whether a specific word is included in an input voice or text and may determine context information about content. For example, the content context determiner 430 may determine whether "please" or a slang word is included in an input voice or text and may determine context information about content, such as a request, a demand, or an argument.

The user relationship context determiner 440 according to various embodiments may determine whether a specific word is included in an input voice or text and may determine context information about a user relationship. For example, the user relationship context determiner 440 may determine whether a word, such as "sir," "kid," "mom," or "papa," is included in an input voice or text and may determine context information about a user relationship, such as a mother-daughter relationship, a father-son relationship, a friendship, or a colleagueship.

Figure 5A:
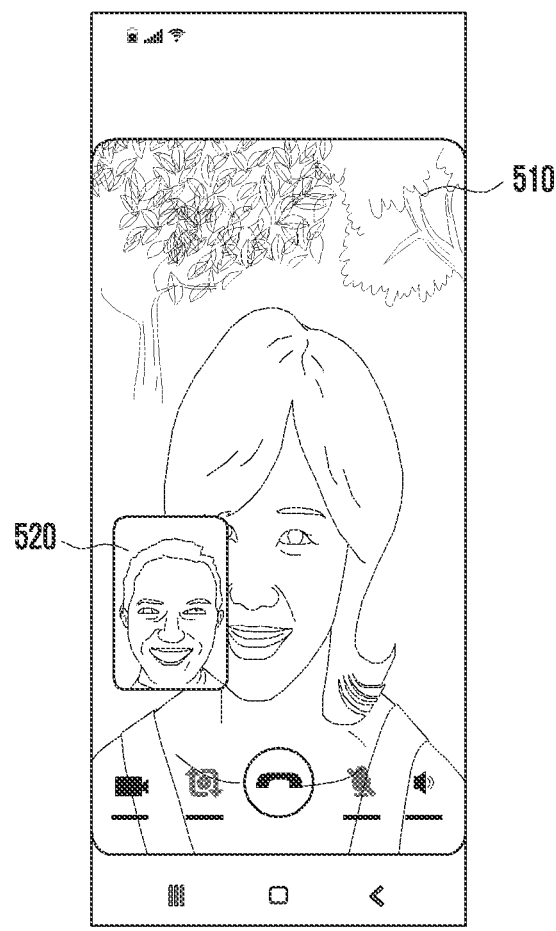
FIG. 5A illustrates an example of determining context according to an embodiment of the disclosure.
Figure 5B:
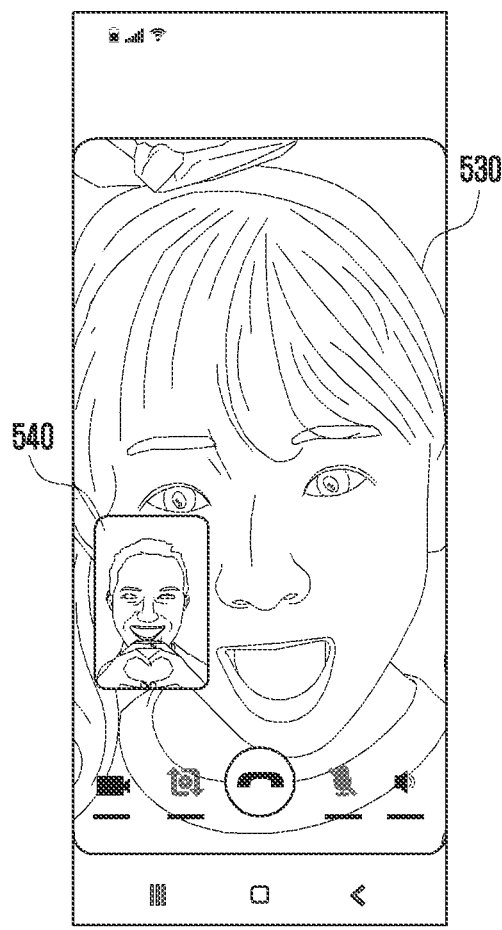
FIG. 5B illustrates an example of determining context according to an embodiment of the disclosure.

FIG. 5A illustrates an example of determining context according to an embodiment of the disclosure, and FIG. 5B illustrates an example of determining context according to an embodiment of the disclosure.

Referring to FIG. 5A, an example in which two people are on a video call in their own languages is illustrated. An electronic device (e.g., the electronic device 210 of FIG. 2A or 2B) may include a front camera and a rear camera. The electronic device 210 may perform a video call using the front and/or rear cameras. For example, an image 520 of a user may be displayed on a portion of the electronic device 210, and an image 510 of a counterpart may also be displayed. The electronic device 210 may analyze the image 520 of the user and/or the image 510 of the counterpart and may determine context information about an environment. For example, the electronic device 210 may determine location context information by identifying a tree and a sky through image analysis. Alternatively, the electronic device 210 may determine that the two people on the call are young people and are a man and a woman and may determine context information about the user including at least some of the age and the gender of the user. Further, the electronic device 210 may include a microphone, and may determine intonations included in the call voices of the two people input through the microphone, thereby determining information about the region of origin of the two people as context information about the user. The electronic device 210 may transmit the determined context information to a server (e.g., the server 220 of FIG. 2A or 2B). Alternatively, the electronic device 210 may transmit the image 510 of the counterpart and/or the image 520 of the user to the server 220. The server 220 may translate voices input by the user and the counterpart based on the context information and may transmit the same to respective electronic devices thereof.

Referring to FIG. 5B, another example in which a relative in a foreign country is on a video call with a child using an electronic device (e.g., the electronic device 210 of FIG. 2A or 2B) is illustrated. The electronic device 210 may include a front camera, a rear camera, and a microphone. The electronic device 210 may display an image 540 captured using, for example, the front camera. The electronic device 210 may also display an image 530 captured by an electronic device (e.g., the electronic device 230 of FIG. 2) of the child. The electronic device 210 may generate context information using the captured image 540 of the relative and/or the image 530 of the child. For example, the electronic device 210 may determine gender and age from the input voices of the child and/or relative and may determine context information about a user. For example, when the relative says "Did you have lunch?," the electronic device 210 may further transmit context information (e.g., girl, 5 years old) to the server 220, and the server 220 may convert "have lunch" into "eat" based on the context information and may transmit "Did you eat?" to the electronic device 230 of the child.

Figure 6:
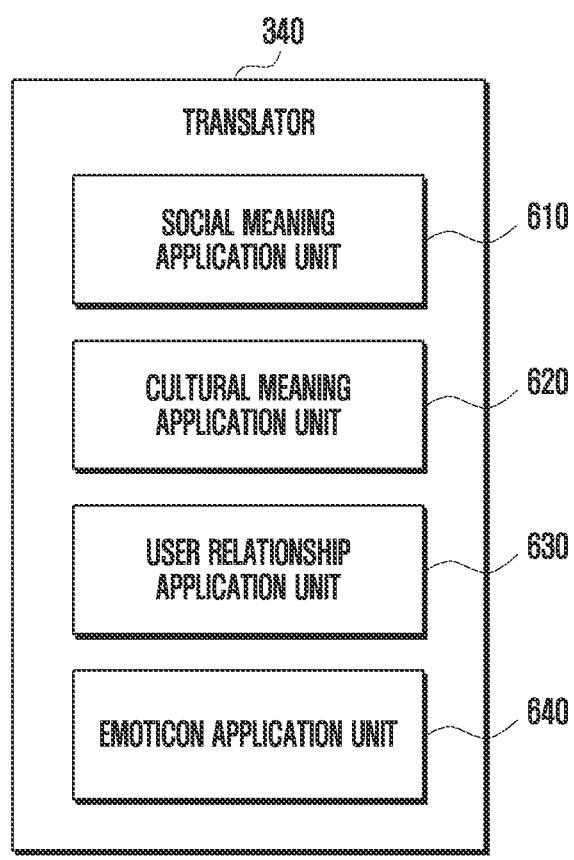
FIG. 6 is a detailed block diagram of a translator according to an embodiment of the disclosure.

FIG. 6 is a detailed block diagram of a translator 340 according to an embodiment of the disclosure.

According to various embodiments, the translator 340 may include at least one of a social meaning application unit 610, a cultural meaning application unit 620, a user relationship application unit 630, or an emoticon application unit 640.

Referring to FIG. 6, the social meaning application unit 610 according to various embodiments may convert translated text in consideration of the social meaning of a language to be translated. For example, centimeter (cm) as a unit of length, Celsius (° C.) as a unit of temperature, and kilogram (kg) as a unit of weight are used in Korea, while feet (ft) as a unit of length, Fahrenheit (° F.) as a unit of temperature, and pound (lb.) as a unit of weight are used in the United States. Therefore, when a unit of temperature, length, or weight is included in translated text, the social meaning conversion unit 610 may convert temperature, length, or weight in consideration of a unit to be converted.

The cultural meaning application unit 620 according to various embodiments may convert translated text in consideration of the cultural meaning of an input language and/or an output language to be translated. For example, "손" (which means "hand") may refer to a body part, and may also refer to help in Korea if the input language is Korean. When a user inputs text or a voice "네 손이 필요해" (which means "I need your hand") into the electronic device 210, the electronic device 210 may translate the text or voice into "I need your hand" without considering the cultural meaning but may translate the text or voice into "I need your help" in consideration of the cultural meaning. For example, a sentence translated as "I need your hand" may be converted into "I need your help." by the cultural meaning application unit 620.

The user relationship application unit 630 according to various embodiments may convert translated text in consideration of a relationship between a user inputting a voice or text and a counterpart. For example, when the counterpart is older than the user or has a higher position than that of the user and an output language to be translated is Korean or Japanese, the user relationship application unit 630 may convert translated text and/or voice into honorific words. The relationship between the user and the counterpart may be analyzed using context information determined by the foregoing context determiner (e.g., the user relationship context determiner 440 of FIG. 4) or using translation-related data. Alternatively, a user relationship may be directly input from the user or the counterpart through a separate translation-related setup screen (e.g., a conversation mode setup screen).

The emoticon application unit 640 according to various embodiments may add an emoticon to translated text or may convert at least part of the translated text into an emoticon. The emoticon application unit 640 may not operate when converting the translated text into a voice. The emoticon application unit 640 may not operate when the translated text does not include text to be converted into an emoticon or there is no emoticon to be converted.

Although at least one of a social meaning, a cultural meaning, a user relationship, and an emoticon is applied after translation in the foregoing description, translation may be performed after applying a social meaning, a cultural meaning, a user relationship, and an emoticon. For example, when translating "손 좀 빌려줘요" (which means "Borrow your hand"), "손 좀 빌려줘요" may be translated into "borrow your hand" and may then be converted into "please help me," or may be converted into "도움이 필요해요" (which means "I need your help") and may then be converted into "please help me."

Figure 7:
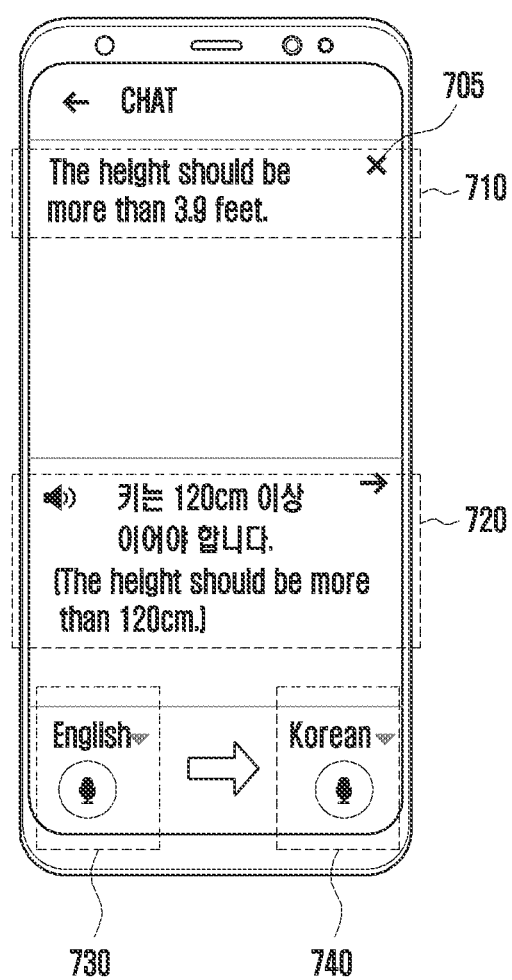
FIG. 7 illustrates an example in which input text is literally translated and an example in which the input text is converted in consideration of social meaning according to an embodiment of the disclosure.

FIG. 7 illustrates an example in which input text is literally translated and an example in which the input text is converted in consideration of social meaning according to an embodiment of the disclosure.

Referring to FIG. 7, a user may select an input language 730 and an output language 740. The user may select English as the input language 730 and may select Korean as the output language 740. The user may input text "The height should be more than 3.9 feet" 710 in English as the input language 730 to an electronic device (e.g., the electronic device 210 of FIG. 2A or 2B). Alternatively, when the user says "The height should be more than 3.9 feet," the electronic device 210 may convert the same into text and may display the text on a display device (e.g., the display device 160 of FIG. 1). When the electronic device 210 translates the input text into Korean without considering social meaning, the input text may be translated into "키는 3.9 피트 이상이어야 합니다" (which means "the height should be more than 3.9 feet"). However, when the electronic device 210 translates the input text in consideration of social meaning, the input text may be converted to "키는 120 cm 이상이어야 합니다" (which means "the height should be more than 120 cm") 720 in Korean.

According to various embodiments, when a translation system is included in a server (e.g., the server 220 of FIG. 2A or 2B), the input language 730 and/or the output language 740 selected by the user may be transmitted as translation-related data to the server 220.

According to various embodiments, the electronic device 210 may include an interface 705 for deleting an input voice and/or text together.

Figure 8:
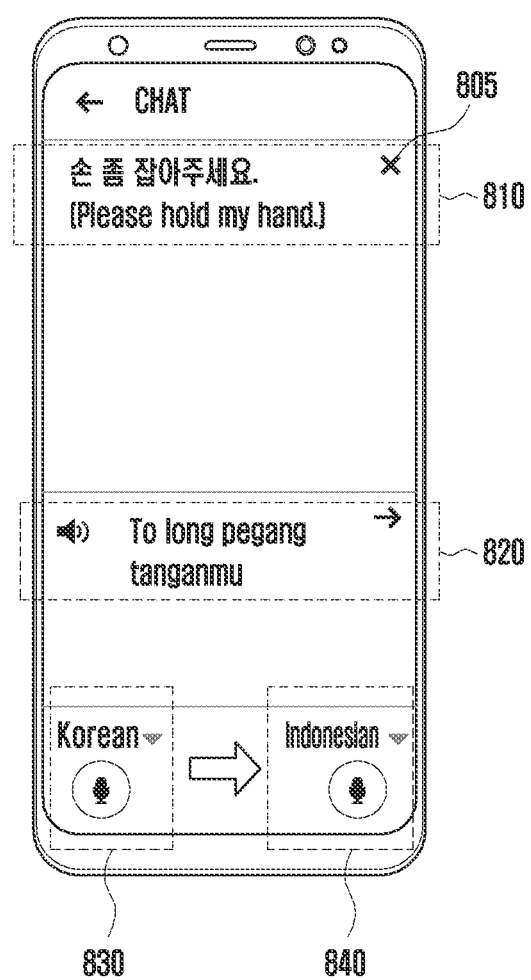
FIG. 8 illustrates an example in which input text is literally translated and an example in which the input text is converted in consideration of cultural meaning according to an embodiment of the disclosure.

FIG. 8 illustrates an example in which input text is literally translated and an example in which the input text is converted in consideration of cultural meaning according to an embodiment of the disclosure.

Referring to FIG. 8, a user may select an input language 830 and an output language 840. The user may select Korean as the input language 830 and may select Indonesian as the output language 840. The user may input text "손 좀 잡아주세요" (which means "Hold my hand") 810 in Korean as the input language 830 to an electronic device (e.g., the electronic device 210 of FIG. 2A or 2B). Alternatively, the user may input "손 좀 잡아주세요" 810 in a voice to the electronic device 210. The electronic device 210 may convert the input voice into text and may display the text on a display device (e.g., the display device 160 of FIG. 1). When the electronic device 210 literally translates the text without considering cultural meaning, the text may be translated into "Tolongpeganglengan Anda." However, when the electronic device 210 translates the text in consideration of cultural meaning, the text may be converted to "Tolongpegangtanganmu" 820 in Indonesian. Words in Indonesian corresponding to a hand and an arm in different languages are interchangeably used. For example, people from other countries use an expression "Hold my hand," while Indonesians use an expression "Hold my arm." Thus, when a person from a country other than Indonesia says "Hold my hand," "Hold my hand" may be translated into "Hold my arm" in Indonesian.

According to various embodiments, the input language 830 and/or the output language 840 selected by the user may be transmitted as translation-related data to a server (e.g., the server 220 of FIG. 2A or 2B) as data related to translation.

According to various embodiments, the electronic device 210 may include an interface 805 for deleting an input voice and/or text together.

Figure 9:
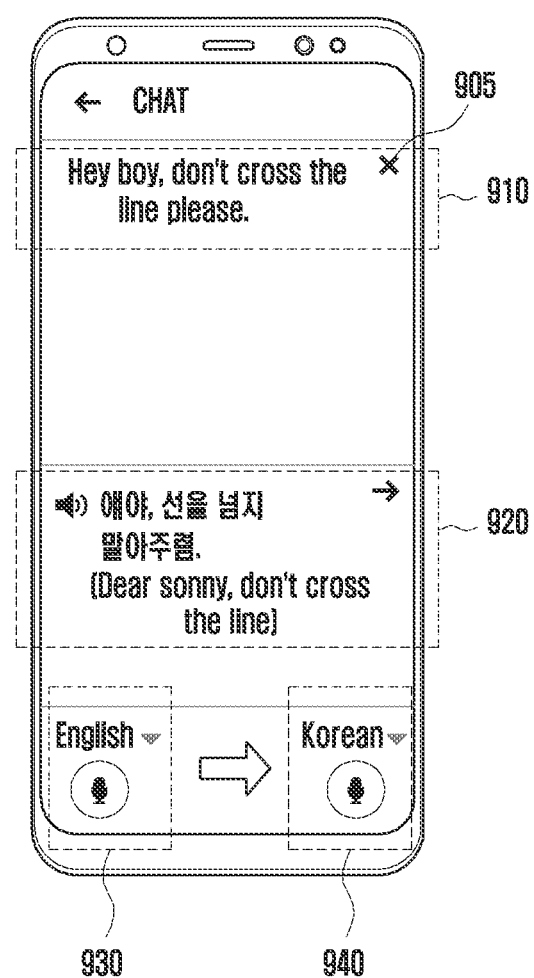
FIG. 9 illustrates an example in which input text is literally translated and an example in which the input text is converted in consideration of a user relationship according to an embodiment of the disclosure.

FIG. 9 illustrates an example in which input text is literally translated and an example in which the input text is converted in consideration of a user relationship according to an embodiment of the disclosure.

Referring to FIG. 9, a user may select an input language 930 and an output language 940. The user may select English as the input language 930 and may select Korean as the output language 940. The user may input text "Hey boy, don't cross the line please" 910 in English as the input language 930 to an electronic device (e.g., the electronic device 210 of FIG. 2A or 2B). Alternatively, when the user inputs "Hey boy, don't cross the line please" 910 in a voice to the electronic device 210, the electronic device 210 may convert the voice into text and may display the text on a display device (e.g., the display device 160 of FIG. 1). When the electronic device 210 literally translates the input text or voice, the text or voice may be translated into "헤이 소년, 선을 넘지 마세요" (which means "Hey boy, do not cross the line please"), and when the electronic device 210 converts the input text or voice in consideration of social meaning, the text or voice may be converted into "애야, 선을 넘지 말아주렴" (which means "Dear sonny, don't cross the line") 920. In addition, the electronic device 210 may determine that the user, for example, a speaker, is older than a counterpart based on "hey boy" and may thus determine context information about an adult-child relationship as a user relationship.

According to various embodiments, the input language 930 and/or the output language 940 selected by the user may be transmitted as translation-related data to a server (e.g., the server 220 of FIG. 2A or 2B) as data related to translation.

According to various embodiments, the electronic device 210 may include an interface 905 for deleting an input voice and/or text together.

Figure 10:
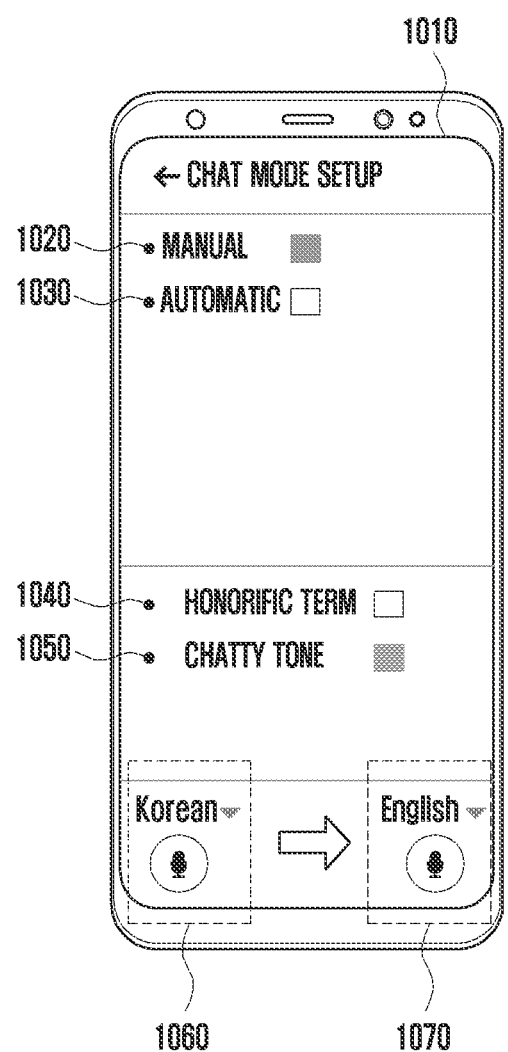
FIG. 10 illustrates an example of a translation-conversion setup interface according to an embodiment of the disclosure.

FIG. 10 illustrates an example of a translation-conversion setup interface according to an embodiment of the disclosure.

Referring to FIG. 10, an electronic device (e.g., the electronic device 210 of FIG. 2A or 2B) may obtain information necessary for translation and conversion using the translation-conversion setup interface 1010 of the electronic device. When a manual mode 1020 is selected, the electronic device 210 may obtain information necessary for translation and conversion using information directly input by a user. When an automatic mode 1030 is selected, the electronic device 210 may analyze a received voice or text and may obtain information necessary for translation conversion.

For example, when a user selects the manual mode 1020, the user may select a specific tone for conversion. The tone for conversion may be determined as context information and may be transmitted to a server (e.g., the server 220 of FIG. 2A or 2B). The tone for conversion may include, for example, an honorific term 1040 and a chatty tone 1050. The user may select the honorific term 1040 when a counterpart is older or has a higher social status than the user. Alternatively, the user may select the chatty tone 1050 when the counterpart is younger than the user or is a friend. In another example, when the user selects the automatic mode 1030 and the received voice or text includes "-요" or "-니다" (which are honorific endings), the electronic device 210 may determine a honorific term as context information and may transmit the context information to the server 220. The server 220 may determine information necessary for translation and conversion using the context information.

According to various embodiments, the translation-conversion setup interface 1010 may include an input language 1060 and/or an output language 1070. The input language 1060 may be automatically selected, and when the input language 1060 is automatically selected, the electronic device may detect the input language. The set input language 1060 and/or output language 1070 may also be transmitted as translation-related data to the server 220.

Figure 11:
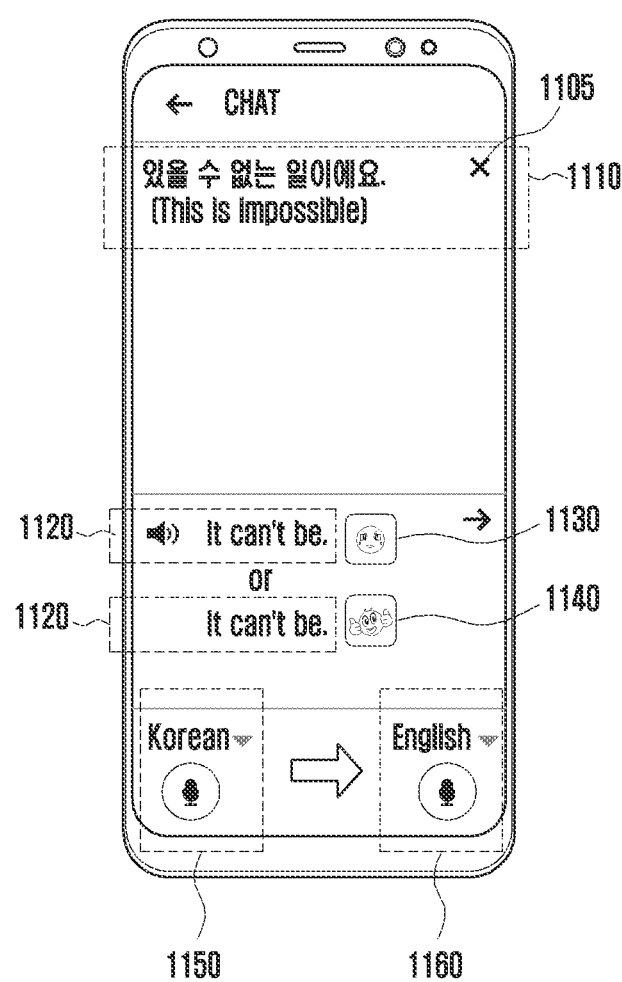
FIG. 11 illustrates an example in which an emoticon is not added to translated text and an example in which an emoticon is added to the translated text according to an embodiment of the disclosure.

FIG. 11 illustrates an example in which an emoticon is not added to translated text and an example in which an emoticon is added to the translated text according to an embodiment of the disclosure.

Referring to FIG. 11, a user may select an input language 1150 and an output language 1160. The user may select Korean as the input language 1150 and may select English as the output language 1160. The user may input " 있을 수 없는 일이에요" (which means "This is impossible") 1110 in the input language 1150 into an electronic device (e.g., the electronic device 210 of 2A or 2B). Alternatively, when the user says " 있을 수 없는 일이에요 " 1110, the electronic device 210 may convert what the user said into text and may display the text on a display device (e.g., the display device 160 of FIG. 1). When it is configured not to use an emoticon or there is no corresponding emoticon, the electronic device 210 may convert the input text into "It can't be" 1120. Alternatively, when it is configured to use an emoticon or there is a corresponding emoticon, an emoticon application unit 640 may convert the input text and may add a first emoticon 1130 or a second emoticon 1140. For example, the electronic device 210 may determine the user's emotion as "sadness" or "satisfaction" based on the user's intonation. The electronic device 210 may retrieve an emoticon corresponding to the user's emotion from a database (e.g., the database 350 of FIG. 3). The database 350 may store the first emoticon corresponding to "sadness" or "crying" and may store the second emoticon corresponding to "happiness" or "satisfaction." The database 350 may also store a language relating to an emoticon. The electronic device 210 may add a corresponding emoticon to the converted text.

According to various embodiments, the electronic device 210 may include an interface 1105 for deleting an input voice and/or text together.

Figure 12:
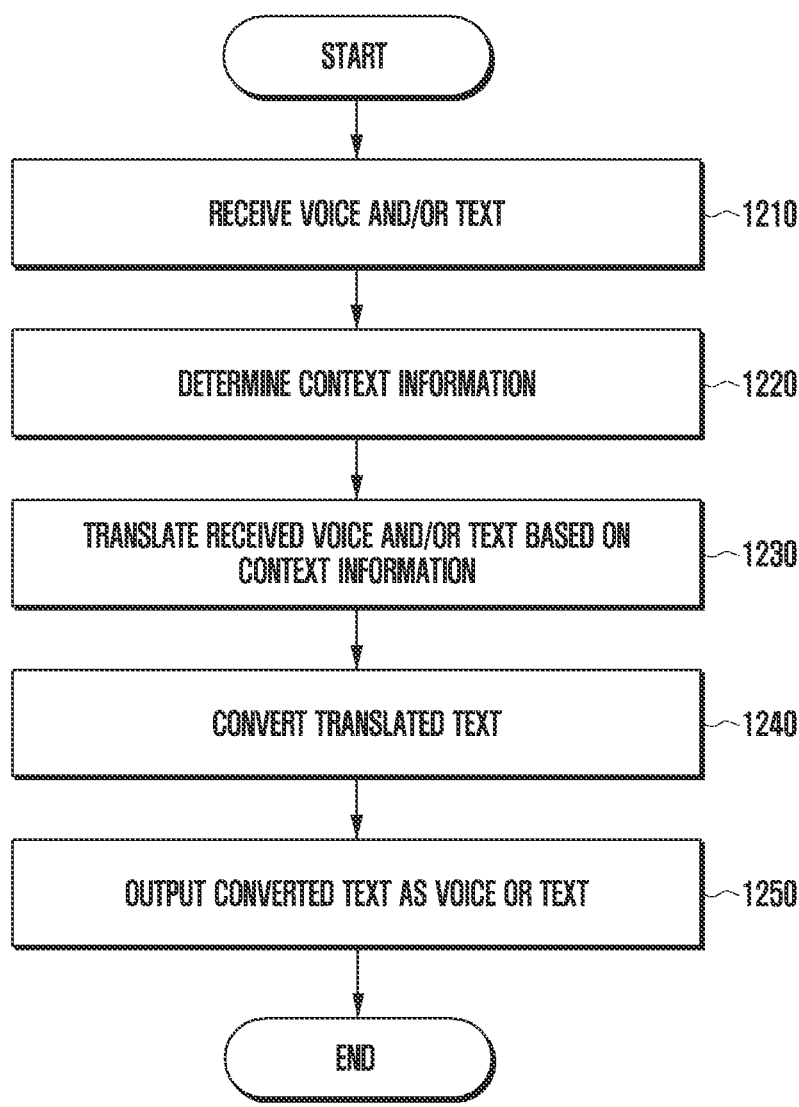
FIG. 12 is a flowchart of an electronic device according to an embodiment of the disclosure.

FIG. 12 is a flowchart of an electronic device according to an embodiment of the disclosure.

An electronic device (e.g., the electronic device 260 of FIG. 2C) according to various embodiments may translate an input voice and/or text. For example, the electronic device 260 may include the input unit 310 to the output unit 360 illustrated in FIG. 3.

Referring to FIG. 12, operations 1210 to 1250 according to various embodiments may be performed by a processor (e.g., the processor 120 of FIG. 1) of the electronic device 260.

According to various embodiments, in operation 1210, the electronic device (e.g., the electronic device 260 of FIG. 2C) may receive a voice and/or text. The electronic device 260 may receive the voice and/or text using the input unit 310. For example, the electronic device 260 may receive a voice using a microphone. In this case, according to an embodiment, a background sound may also be received in addition to the voice of a user. The electronic device 260 may receive text using a keyboard or a touchscreen. Alternatively, the electronic device 260 may receive text by scanning the text using a camera. When the voice is received, the electronic device 260 may convert the received voice into text. The electronic device 260 may use a software program to convert a voice into text.

According to various embodiments, in operation 1220, the electronic device 260 may determine context information. Alternatively, the electronic device 260 may receive context information from a different external electronic device. For example, the electronic device 260 may receive an image using a front camera and/or a rear camera and may analyze the image, thereby determining context information about a user (or speaker) and/or an environment. Alternatively, the electronic device 260 may analyze a voice received through a microphone, thereby determining context information. For example, information about the gender, age, and emotion of a user may be determined as context information. The electronic device 260 may determine context information using a sensor module (e.g., a GPS or an acceleration sensor). For example, the electronic device 260 may determine location information, time information, whether a user moves, and information about transportation when the user moves as context information.

According to various embodiments, the electronic device 260 may determine context information by receiving the context information from the user. For example, the user may configure the electronic device 260 to automatically or manually determine at least some context information. When the user selects "automatic," the electronic device 260 may determine context information about an environment and/or the user. For example, a processor 120 of the electronic device 260 may determine context information through a context determiner 330. When the user selects "manual," the electronic device 260 may provide the user with a user interface to determine translation-related data as context information. The electronic device 260 may determine context information using information selected by the user.

According to various embodiments, in operation 1230, the electronic device 260 may translate the received voice or text based on the context information. For example, the electronic device 260 may convert the voice received through the input unit 310 into text through the language processor 320 and may then translate the text using the translator 340. The electronic device 260 may translate the received text in the translator 340 without passing through the language processor 320.

According to various embodiments, in operation 1240, the electronic device 260 may convert the translated text. The electronic device 260 may determine whether the translated text includes a word representing a predetermined social meaning, cultural meaning, and/or speaker relationship. When the word representing the predetermined social meaning, cultural meaning, and/or speaker relationship is included in the translated text, the electronic device 260 may convert the word into a word corresponding to the word.

According to various embodiments, in operation 1250, the electronic device 260 may output the converted text as a voice and/or text. For example, the electronic device 260 may transmit the converted text to a different electronic device. The electronic device 260 may output the converted text as a voice. The voice may be output through an output unit (e.g., a speaker). The electronic device 260 may display the converted text on an output unit (e.g., a display).

Figure 13:
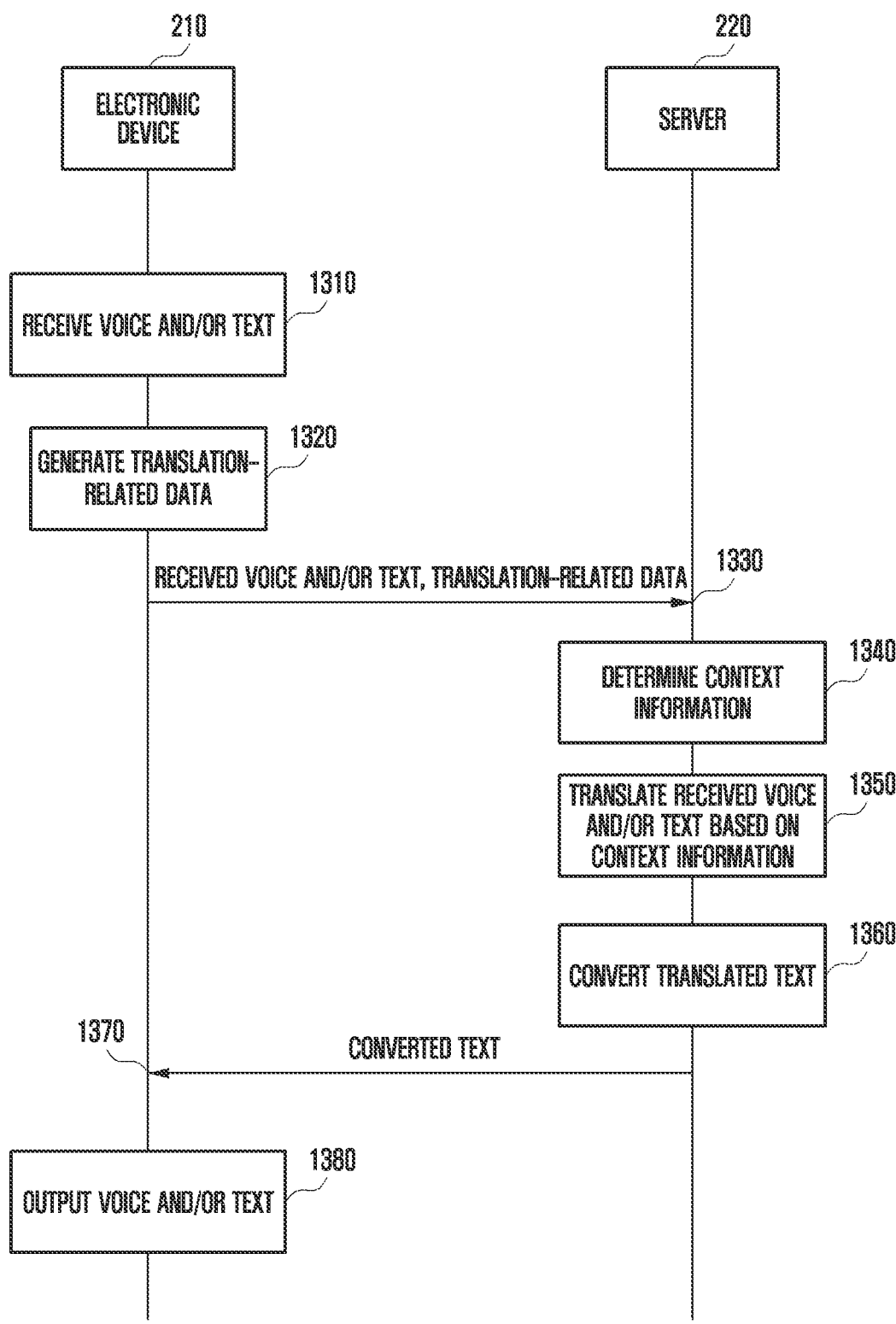
FIG. 13 is a flowchart between an electronic device and a server according to an embodiment of the disclosure.

FIG. 13 is a flowchart between an electronic device and a server according to an embodiment of the disclosure.

According to various embodiments, the server 220 may include the input unit 310 to the output unit 360 illustrated in FIG. 3.

Referring to FIG. 13, operations 1310 to 1370 may be performed by a processor of the electronic device 210 or a processor of the server 220.

According to various embodiments, the electronic device (e.g., the electronic device 210 of 2A or 2B) may receive a voice and/or text at operation 1310. The electronic device 210 may include an input device (e.g., the input device 150 of FIG. 1), such as a microphone, a keyboard, or a touchscreen and may receive the voice and/or text through the input device 150. The received voice may be converted into text by the electronic device 210.

According to various embodiments, the electronic device 210 may determine translation-related data including context information at operation 1320. For example, the electronic device 210 including a sensor module (e.g., the sensor module 176 of FIG. 1), such as a global positioning system (GPS), may obtain time and/or location information using the sensor module 176 and may determine context information. When the electronic device 210 includes a front camera and/or a rear camera, the electronic device 210 may determine context information about an environment and/or a speaker using the front camera and/or the rear camera. When the electronic device 210 includes a microphone, the electronic device 210 may determine context information by analyzing an ambient sound and the voice of the speaker received through the microphone.

According to various embodiments, the electronic device 210 may determine context information by receiving the context information from a user. For example, the user may configure the electronic device 210 to automatically or manually determine at least some context information. When the user selects "automatic," the electronic device 210 may determine context information about an environment and/or the user using an included component. When the user selects "manual," the electronic device 210 may provide the user with a user interface to select information relating to context available for translation. The electronic device 210 may determine context information using the information selected by the user.

According to various embodiments, the determined context information may be included in the translation-related data.

According to various embodiments, the electronic device 210 may transmit the received voice and/or text and the determined translation-related data to a server (e.g., the server 220 of FIG. 2A or 2B) at operation 1330. Although FIG. 13 shows that the electronic device 210 transmits the translation-related data simultaneously with the received voice and/or text, the electronic device 210 may sequentially transmit the received voice and/or text and the determined context information. Alternatively, the electronic device 210 may transmit the received voice and/or text after receiving the voice and/or text and may transmit the translation-related data after determining the translation-related data.

According to various embodiments, the server 220 may receive the voice and/or text and the translation-related data from the electronic device 210 through the input unit 310.

According to various embodiments, the server 220 may determine context information using the voice and/or text and the translation-related data at operation 1340. The server 220 may further determine context information by retrieving a database (e.g., the database 350 of FIG. 3).

According to various embodiments, the server 220 may translate the text based on the determined context information at operation 1350. The server may first convert the received voice into text and may translate the converted text. Information about a language for translation (e.g., an input language and an output language) may be transmitted from the electronic device 210.

According to various embodiments, the server 220 may convert the translated text at operation 1360. The server 220 may determine whether the translated text includes a word representing a predetermined social meaning, cultural meaning, and/or speaker relationship. When the word representing the predetermined social meaning, cultural meaning, and/or speaker relationship is included in the translated text, the server 220 may convert the word into a word corresponding to the word.

According to various embodiments, the server 220 may transmit the converted text to the electronic device 210 at operation 1370. Alternatively, the server 220 may convert the converted text back to a voice and may transmit the voice to the electronic device 210.

According to various embodiments, the electronic device 210 may convert the received text into a voice and may output the voice using the output unit 360 (e.g., a speaker). The electronic device 210 may display the received text using the output unit 360 (e.g., a display) at operation 1380. The electronic device 210 may output both the voice and the text by selection.

An electronic device according to various embodiment may include an input configured to receive a voice or text, an output unit, and a processor, wherein the processor may be configured to: determine context information; translate the received voice or text based on the context information; convert the translated voice or text; and output the converted voice or text using the output unit.

In the electronic device according to various embodiment, when the input unit receives the voice, the processor may be configured to convert the received voice into a text.

In the electronic device according to various embodiment, the context information may include at least one of information about a time when the voice or text is received or geographical information.

In the electronic device according to various embodiment, the context information may include at least one of a facial expression or a tone of a speaker of the voice or text.

In the electronic device according to various embodiment, the context information may include information about whether the received voice or text includes a predetermined word.

In the electronic device according to various embodiment, the context information may include information about whether the received voice or text includes a word representing a relationship between a speaker and a counterpart.

In the electronic device according to various embodiment, when the translated voice or text includes a word representing a predetermined social meaning, the processor may be configured to convert the word into a word corresponding to a social meaning of a language for translation.

In the electronic device according to various embodiment, when the translated voice or text includes a word representing a predetermined cultural meaning, the processor may be configured to convert the word into a word corresponding a cultural meaning of a language for translation.

In the electronic device according to various embodiment, when the translated voice or text includes a word representing a relationship between a speaker and a counterpart, the processor may be configured to convert the translated voice or text in consideration of the relationship between the speaker and the counterpart.

In the electronic device according to various embodiment, when the translated voice or text includes a predetermined word, the processor may be configured to add an emoticon corresponding to the predetermined word or to convert the predetermined word into an emoticon.

An operating method of an electronic device according to various embodiment may include: receiving a voice or text; determining context information; translating the received voice or text based on the context information; converting the translated voice or text; and outputting the converted voice or text.

The operating method of the electronic device according to various embodiment may further include converting the received voice into a text when the voice is received.

In the operating method of the electronic device according to various embodiment, the context information may include at least one of information about a time or geographical information.

In the operating method of the electronic device according to various embodiment, the context information may include at least one of a facial expression or a tone of a speaker of the voice or text.

In the operating method of the electronic device according to various embodiment, the context information may include information about whether the received voice or text includes a predetermined word.

In the operating method of the electronic device according to various embodiment, the context information may include information about whether the received voice or text includes a word representing a relationship between a speaker and a counterpart.

In the operating method of the electronic device according to various embodiment, the converting of the translated voice or text may include converting a word representing a predetermined social meaning into a word corresponding to a social meaning of a language for translation when the translated voice or text includes the word representing the predetermined social meaning.

In the operating method of the electronic device according to various embodiment, the converting of the translated voice or text may include converting a word representing a predetermined cultural meaning into a word corresponding a cultural meaning of a language for translation when the translated voice or text includes the word representing the predetermined cultural meaning.

In the operating method of the electronic device according to various embodiment, the converting of the translated voice or text may include converting the translated voice or text in consideration of a relationship between a speaker and a counterpart when the translated voice or text includes a word representing the relationship between the speaker and the counterpart.

In the operating method of the electronic device according to various embodiment, the converting of the translated voice or text may include adding an emoticon corresponding to a predetermined word or converting the predetermined word into an emoticon converting when the translated voice or text includes the predetermined word.

Various other embodiments are possible.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    at least one camera;
    an input unit configured to receive a voice input or a text input;
    an output unit;
    a processor; and
    memory storing instructions that, when executed by the processor, cause the electronic device to:
        perform a video call,
            acquire a first image, from the at least one camera, and a first voice of a user, from the input unit,
            acquire, from contents of the video call, a second image and a second voice of a counterpart of the video call,
            based on at least one of the first image or the first voice, obtain context information relating to the user of the electronic device,
            based on at least one of the second image or the second voice, obtain context information relating to the counterpart of the video call,
            based on the context information relating to the user of the electronic device and the context information relating to the counterpart of the video call, translate the voice input or the text input,
            convert the translated voice input or the translated text input into a voice output or a text output, and
            output the voice output or the text output using the output unit,
        wherein, based on the electronic device operating in a first mode, the context information relating to the user of the electronic device is determined using at least one sensor of the electronic device, and
        wherein, based on the electronic device operating in a second mode, the context information relating to the user of the electronic device is determined using information selected by the user from a user interface displayed by the electronic device.

2. The electronic device of claim 1, wherein the instructions, when executed by the processor, further cause the electronic device to:
    in response to the input unit receiving the voice input, convert the voice input into text.

3. The electronic device of claim 1, wherein the context information of the user comprises at least one of information about a time at which the voice input or text input is received or geographical information.

4. The electronic device of claim 1, wherein the context information of the user comprises at least one of a facial expression or a tone of the user.

5. The electronic device of claim 1, wherein the context information of the user comprises information about whether the voice input or the text input comprises a predetermined word.

6. The electronic device of claim 1, wherein the context information of the user comprises information about whether the voice input or the text input comprises a word representing a relationship between the user and the counterpart.

7. The electronic device of claim 1, wherein the instructions, when executed by the processor, further cause the electronic device to:
    based on the translated voice input or the translated text input comprising a word representing a predetermined social meaning, convert the word into a word corresponding to a social meaning of a language for translation.

8. The electronic device of claim 1, wherein the instructions, when executed by the processor, further cause the electronic device to:
    based on the translated voice input or the translated text input comprising a word representing a predetermined cultural meaning, convert the word into a word corresponding to a cultural meaning of a language for translation.

9. The electronic device of claim 1, wherein the instructions, when executed by the processor, further cause the electronic device to:
    based on the translated voice input or the translated text input comprising a word representing a relationship between the user and the counterpart, convert the translated voice input or the translated text input in consideration of the relationship between the user and the counterpart.

10. The electronic device of claim 1, wherein the instructions, when executed by the processor, further cause the electronic device to:
    based on the translated voice input or the translated text input comprising a predetermined word, add an emoticon corresponding to the predetermined word or convert the predetermined word into the emoticon.

11. An operating method of an electronic device, the operating method comprising:
    receiving a voice input or a text input;
    performing a video call,
        acquiring a first image, from at least one camera of the electronic device, and a first voice of a user, from the voice input;
        acquiring, from contents of the video call, a second image and a second voice of a counterpart of the video call;
        based on at least one of the first image or the first voice, obtaining context information relating to the user of the electronic device;
        based on at least one of the second image or the second voice, obtaining context information relating to the counterpart of the video call;
        based on the context information relating to the user of the electronic device and the context information relating to the counterpart of the video call, translating the voice input or the text input;
        converting the translated voice input or the translated text input into a voice output or a text output; and
        outputting the voice output or the text output,
    wherein, based on the electronic device operating in a first mode, the context information relating to the user of the electronic device is determined using at least one sensor of the electronic device, and
    wherein, based on the electronic device operating in a second mode, the context information relating to the user of the electronic device is determined using information selected by the user from a user interface displayed by the electronic device.

12. The operating method of claim 11, further comprising:
    in response to receiving the voice input, converting the voice input into text.

13. The operating method of claim 11, wherein the context information relating to the user comprises at least one of information about a time at which the voice input or text input is received or geographical information.

14. The operating method of claim 11, wherein the context information relating to the user comprises at least one of a facial expression or a tone of a person corresponding to the voice input or text input.

15. The operating method of claim 11, wherein the context information relating to the user comprises information about whether the voice input or the text input comprises a predetermined word.

16. The operating method of claim 11,
wherein the first mode or the second mode is set by the user.

* * * * *